United States Patent
Galand et al.

(10) Patent No.: US 6,529,512 B1
(45) Date of Patent: Mar. 4, 2003

(54) STATISTICAL METHOD OF DATA COMPRESSION AND DECOMPRESSION

(75) Inventors: Claude Galand, La Colle sur Loup; Gerald Lebizay, Vence; Jean-Francois Le Pennec, Nice; Maurice Duault, Saint Laurent du Var, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/031,755

(22) Filed: Feb. 27, 1998

(30) Foreign Application Priority Data

Jul. 15, 1997 (EP) .............................................. 97480046

(51) Int. Cl.⁷ .............................................. H04Q 11/00
(52) U.S. Cl. ...................................................... 370/400
(58) Field of Search .................................. 370/395, 230, 370/231, 401, 402, 428, 474, 473, 389, 397, 503, 506, 509, 510, 512, 551, 552, 251, 252, 248, 254, 535, 537, 468, 476, 477; 341/51, 107, 63, 84; 382/232, 239, 190; 709/203, 226, 228, 247; 704/502; 375/240; 713/151; 345/543; 358/426; 348/384.1, 441, 500, 443, 359; 379/93, 15, 225, 224, 219, 221, 220, 226, 229, 231, 232

(56) References Cited

U.S. PATENT DOCUMENTS

| | | | | |
|---|---|---|---|---|
| 5,293,379 A | * | 3/1994 | Carr .............................. | 370/474 |
| 5,307,413 A | * | 4/1994 | Denzer .......................... | 380/49 |
| 5,412,384 A | * | 5/1995 | Chang et al. .................. | 341/79 |
| 5,412,741 A | * | 5/1995 | Shapiro ........................ | 382/232 |
| 5,521,940 A | * | 5/1996 | Lane et al. ................... | 375/240 |
| 5,526,353 A | * | 6/1996 | Henley et al. ............... | 370/392 |
| 5,663,721 A | * | 9/1997 | Rossi ............................ | 341/51 |
| 5,790,552 A | * | 8/1998 | Proctor et al. .............. | 370/466 |
| 5,982,783 A | * | 11/1999 | Frey et al. ................... | 370/467 |
| 5,999,529 A | * | 12/1999 | Bernstein et al. ........... | 370/376 |
| 6,041,064 A | * | 3/2000 | Kurdzo et al. .............. | 370/466 |
| 6,044,082 A | * | 3/2000 | Nygard et al. .............. | 370/437 |

\* cited by examiner

*Primary Examiner*—Dang Ton
(74) *Attorney, Agent, or Firm*—Morgan & Finnegan, LLP (57) ABSTRACT

A communication system and method for compressing data in a transmission system wherein multiplexed channels are transported over a transmission network of the type comprising a plurality of switching nodes interconnected by connection lines, the exchange of data signals carried out by switching the channels in the network between two exchange telephone devices, and each of the multiplexed channels transporting data bytes representing the data signals from one source exchange telephone device to one destination exchange device during an exchange of information therebetween through the intermediary of a compression/decompression device. The method comprises the steps of comparing, for each multiplexed channel, the signal value associated to each one of a plurality of "n" consecutive data bytes to a predetermined threshold; deleting, in case said signal value for all said "n" data bytes is less than the predetermined threshold, all bits which are not necessary to represent the signal value from each of the "n" data bytes; building a compression frame by concatenating either the "n" data bytes when they are not modified or the "n" modified data bytes when bits have been deleted therefrom, and adding to each of said groups an identifier indicating whether said data bytes are modified or not before transmitting said compression frame over said transmission network. Decompressing the frame by determining the identifier value indicating the composition of the bytes; removing the identifier from the bytes; loading the bytes into a buffer and transmitting the bytes to a destination exchange telephone device.

29 Claims, 7 Drawing Sheets

STATISTICAL METHOD OF DATA COMPRESSION AND DECOMPRESSION

BACKGROUND OF INVENTION

(1) Technical Field

The present invention relates generally to communication systems. More particularly, the invention relates to communication systems for transmission of information signals between two exchange telephone devices over a transmission network and to a method of data compression/decompression using statistical criteria.

(2) Background Discussion

The telecommunication environment is in full evolution and has changed considerably these recent years. The principal reason has been the spectacular progress realized in the communication technology due to the maturing of fiber optical transmission (high-speed rates can now be sustained with very low bit error rates) and the universal use of digital technologies within private and public telecommunications networks.

In relation with these new emerging technologies, the offerings of the telecommunication companies, public or private, are evolving. Indeed, the emergence of high speed transmissions entails an explosion in the high bandwidth connectivity; the increase of the communication capacity generates more attractive tariffs; a higher flexibility is offered to the users to manage their growth through a wide range of connectivity options, an efficient bandwidth management and the support of new media; and once sampled and digitally encoded, voice, video and image derived data can be merged with pure data for a common and transparent transport.

In a first step, networks were primarily deployed with TDM (Time Division Multiplexing) technology to achieve cost savings through line aggregation. These systems easily supported the fixed bandwidth requirements of host/terminal computing and 64 Kbps PCM (Pulse Code Modulation) voice traffic.

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures—hierarchical versus peer to peer, wide (WAN) versus local (LAN) area networks, voice versus data—the data profile has become higher in bandwidth, bursting, non deterministic and requires more connectivity. Based on the above, it is clear that there is strong requirement to support distributed computing applications across high speed backbones that may be carrying LAN traffic, voice, video, and traffic among channel attached hosts, business workstations, engineering workstations, terminals, and small to intermediate file servers. This traffic reflects a heterogeneous mix of: end user network protocols, and real time (steady stream traffic such as voice and video) and non real time (bursty nature traffic such as interactive data) transmissions.

The vision of a high-speed protocol-agile backbone network is the driver for the emergence of fast packet switching network architecture in which data, voice, and video information are digitally encoded, chopped into small packets and transmitted through a common set of nodes and links.

The basic advantage of packet switching techniques, compared to circuit switching techniques, is to allow a statistical multiplexing of different types of data over a line (data, voice, image, video), which optimizes the bandwidth. The drawback of packet switching techniques, compared to circuit switching techniques, is that packet switching typically introduces an overhead for every packet that is transported. One can reduce such an overhead by using compression techniques. However, if these techniques apply well to the compression of individual telephony circuits, they are not appropriate to the compression of complete telephony trunks between private or public automatic exchanges (PABX) and central exchanges (CX).

The existing techniques of compression depend upon the information which is transmitted that is voice, data or video. Several types of voice compression are available. They are generally adapted to perform compression on a limited number of channels as they require a lot of computing power to be efficient. They are more efficient if they work on a lot of samples introducing delay and complexity. Furthermore, they are not reversible, which means loss of information if the contents of the channel are not only voice signals but fax, modem, data or video signals.

For pure data, the compression protocol is principally V.42 bis based on Lempel-Ziv algorithm. In all cases, data compression is fully reversible as the purpose is of course to have the same data at both the input and the output, which is not the case for voice or video. However, the algorithm used for data compression takes advantage of the abnormal distribution of data which is not random so that the compression ratio which is applied to voice and video signal is not good. Furthermore, the data compression on high speed line requires an important computing power.

As far as compression of video signals is concerned, the techniques of compression (e.g., MPEG or JPEG) are very specific to image characteristics, require an important computing power and are not compatible with data or voice compression.

SUMMARY OF THE INVENTION

Accordingly, an object of the invention is to provide a method of compression specially oriented to compression of voice channels which present a very low delay and a full reversibility and is therefore compatible with all kinds of data transported over a transmission network.

The invention is achieved in a data transmission system and method for compressing data in the transmission system wherein multiplexed channels are transported over a transmission network of the type comprising a plurality of switching nodes interconnected by connection lines. The network includes intermediary switching nodes connected only to the other switching nodes and end switching nodes each connected to at least an exchange telephone device. Each switching node is associated with a control point in charge of controlling the exchange of data signals carried out by switching the channels in the network between two exchange telephone devices. The control points aiding the associated switching nodes determine the best route between any source exchange telephone device and any destination exchange telephone device. Each of the multiplexed channels transports data bytes representing the data signals from one source exchange telephone device to one destination exchange device during an exchange of information therebetween. The method comprises the steps of comparing, for each multiplexed channel, the signal value associated to each one of a plurality of n consecutive data bytes to a predetermined threshold; deleting, in case said signal value for all said n data bytes is less than the predetermined threshold, all bits which are not necessary to represent the signal value from each of the n data bytes; building a frame by concatenating either the n data bytes when they are not modified or the n modified data bytes when bits have been deleted therefrom; adding to the frame an identifier indicating whether the data bytes are modified or not before transmitting this frame over the transmission network; decompressing the frame by determining the identifier value indicating the composition of the bytes; removing the identifier from the bytes; loading the bytes into a buffer and transmitting the bytes to the destination exchange telephone device.

BRIEF DESCRIPTION OF THE DRAWINGS

The above set forth and other objects and features of the inventions will be made clear from the following description of a preferred embodiment in reference to the accompanying drawings, wherein.

DETAILED DESCRIPTION OF THE PREFERRED EMBODIMENT

Figure 1:
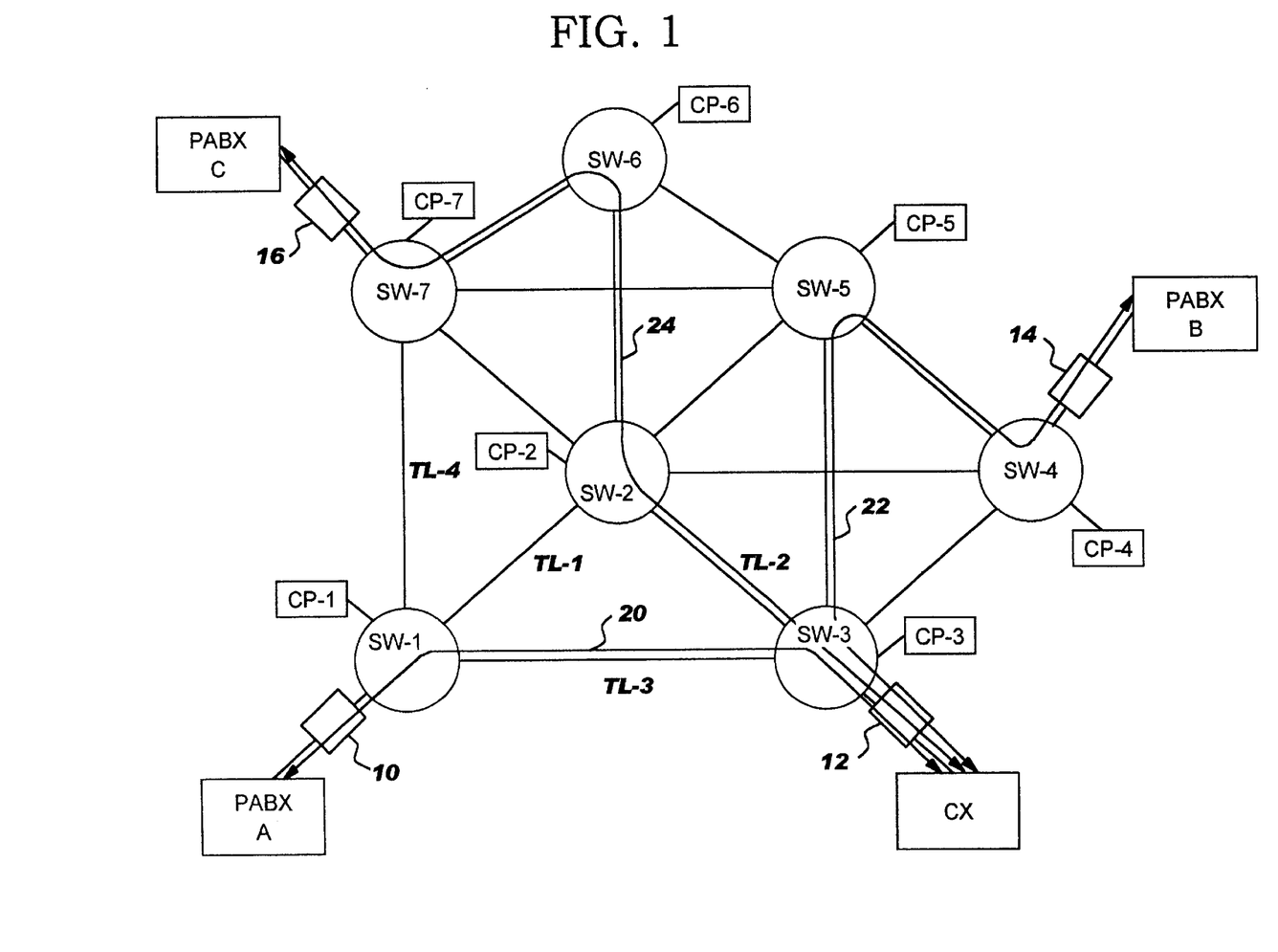
FIG. 1 is a schematic representation of voice circuit connections in a packet switching network, according to a preferred embodiment of the invention.

FIG. 1 represents a packet switching network of the ATM type used as a transport network of voice channels according to a preferred embodiment of the invention, bearing in mind that other signals such as data or video signals can also be transported by the voice channels. The end switching nodes are equipped with compression/decompression devices, such as switching nodes SW-1, SW-3, SW-4 ... SW-7 which are equipped respectively with compression/decompression devices 10, 12, 14 ... 16. Each of these end switching nodes is connected with an exchange telephone device which can be private exchange devices such as PABX A connected to switching node SW-1 by the intermediary of compression/decompression device 10, PABX B connected to switching node SW-4 by the intermediary of compression/decompression device 14 or PABX C connected to switching node SW-7 by the intermediary of compression/decompression device 16. The end exchange telephone device can also be a central exchange device such as CX connected to switching node SW-3 by the intermediary of compression/decompression device 12.

PABX's A,B and C are connected to the switching nodes of the network via E1 interfaces (or T1 in the USA or J1 in Japan). Central exchange CX, also connected to the network via E1 interfaces, is logically connected to all PABX's and is in charge of routing the phone calls. The connection 20 between CX and PABX A is through switching nodes SW-3 and SW-1; the connection 22 between CX and PABX B is through SW-3, SW-S and SW-4; and the connection 24 between CX and PABX C is through SW-3, SW-2, SW-6 and SW-7. Though the example of FIG. 1 includes a single CX connected to a plurality of PABX's, the invention is also applicable when several CX's are interconnected.

The connections 20, 22 and 24 are assigned a priority for scheduling at the different switches of the transport network. They are also established with a bandwidth reservation corresponding to the number of voice circuits transported in the connection. Usually, there are many connections (up to several hundreds) between PABX's and CX's in order to sustain peak hour call demands. It must be noted that connections 20, 22, 24 can be set up permanently, but they can also be set up at regular instants or when the number of new telephone calls is more than a predetermined threshold.

The data are transmitted within frames on interfaces E1 between an exchange telephone device (PABX or CX) and the associated end switching node. Each frame is composed of slots wherein each slot contains 32 bytes (among which 31 bytes, and in some cases 30 bytes, are dedicated to voice channels) and a total of 64 E1 links can be multiplexed resulting in a bit rate of 155 Mbits/s.

Figure 2:
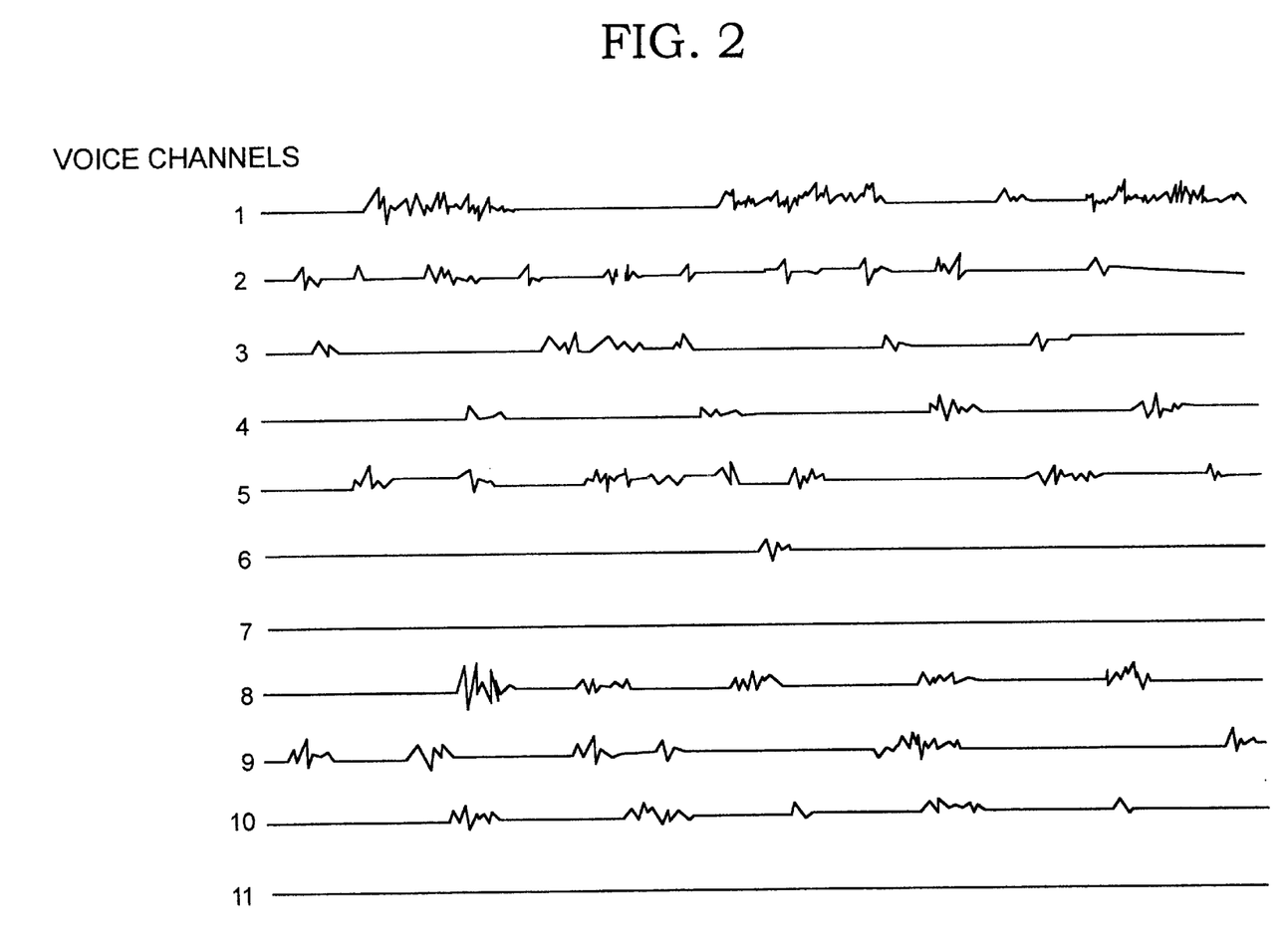
FIG. 2 shows diagrams of various signals on voice channels which can be provided by exchange telephone devices in the network illustrated in FIG. 1.

FIG. 2 illustrates the variations of the signal duration on each of the voice channels or circuits of FIG. 1 and which are very different from one channel to the other.

Some circuits such as circuits 7 or 11 are idle since they do not carry telephone calls. The proportion of idle circuits depends on the time of day. As explained below, their detection can be exploited to reduce the bandwidth reservation for the connection.

Active voice circuits, such as circuits 1 and the like, exhibit silence and speech periods. Since the communication of voice signals is half duplex, it can be assumed that the ratio of silence periods is at least 50% of the full time.

In order to make the ATM network used in the preferred embodiment of the invention practical it is necessary to adapt the internal network characteristics to those of the various traffic types that will use the network. This is the function of the ATM adaptation layer AAL which provides generalized interworking across the network. This function is to take frames of data delivered to the layer, to break them up into cells of 48 bytes and to add necessary header information (5 bytes) to allow rebuilding of the original frame at a receiver side or destination exchange telephone device.

There are 5 different AAL types, AAL1 to AAL5 adapted to the different kinds of the information signals which are transported over the network.

In the present embodiment, AAL1 is the most appropriate structure for handling E1 connections. Indeed, AAL1 is used for constant-bit-rate traffic, that is when the input and output to the network are in the form of a constant, timed stream of bits. In practice, this takes the form of a frame where the rate is constant but data exists in different parts of the frame so that the frame arrives in the network in short bursts with periods of nothing or silence in-between.

Figure 3:
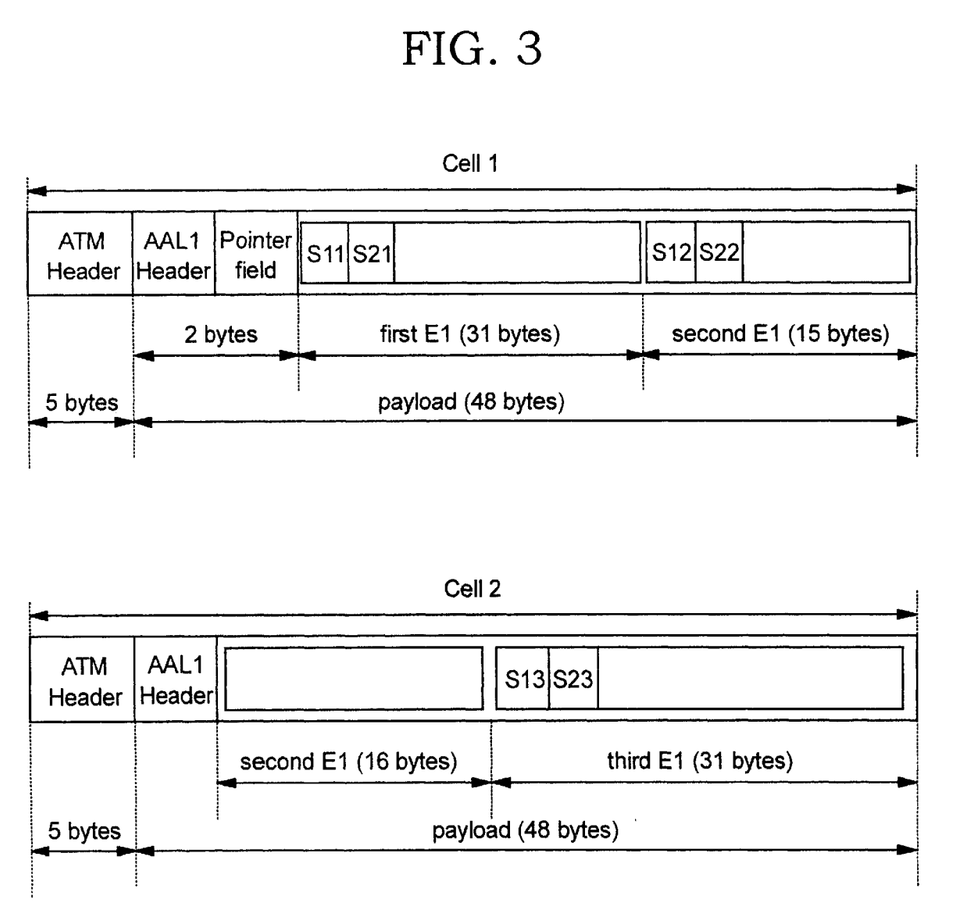
FIG. 3 is a representation of a two ATM cell sequence used for a compression algorithm according to a preferred embodiment of the invention.

On an AAL interface, each ATM cell includes a payload of bytes and an ATM Header of 5 bytes, as illustrated in FIG. 3. Such an ATM Header contains the information defining the Virtual Path (VP) and the Virtual Circuit (VC) which have to be used in the transmission network. Note that all the cells of a data stream to be transmitted between a source exchange telephone device and a destination exchange telephone device have the same VP/VC bits in the ATM Header.

Each payload contains an AAL header on one byte, and a pointer field of one byte is added to each 2 cells in order to synchronize the protocol in case of transmission error. Accordingly, if three E1 frames of 31 bytes each are grouped together, they form together with the information bytes a frame of 106 bytes corresponding exactly to 2 ATM cells formed of a 48 byte payload and a 5 byte ATM header, wherein the second E1 frame overlaps the two ATM cells. As illustrated in FIG. 2, a channel assigned to a session between a source exchange telephone device and a destination exchange telephone device is present in each E1 frame. Thus, bytes S11 in first E1 frame, S12 in second E1 frame and S13 in third E1 frame corresponds to a same channel S1.

Figure 4:
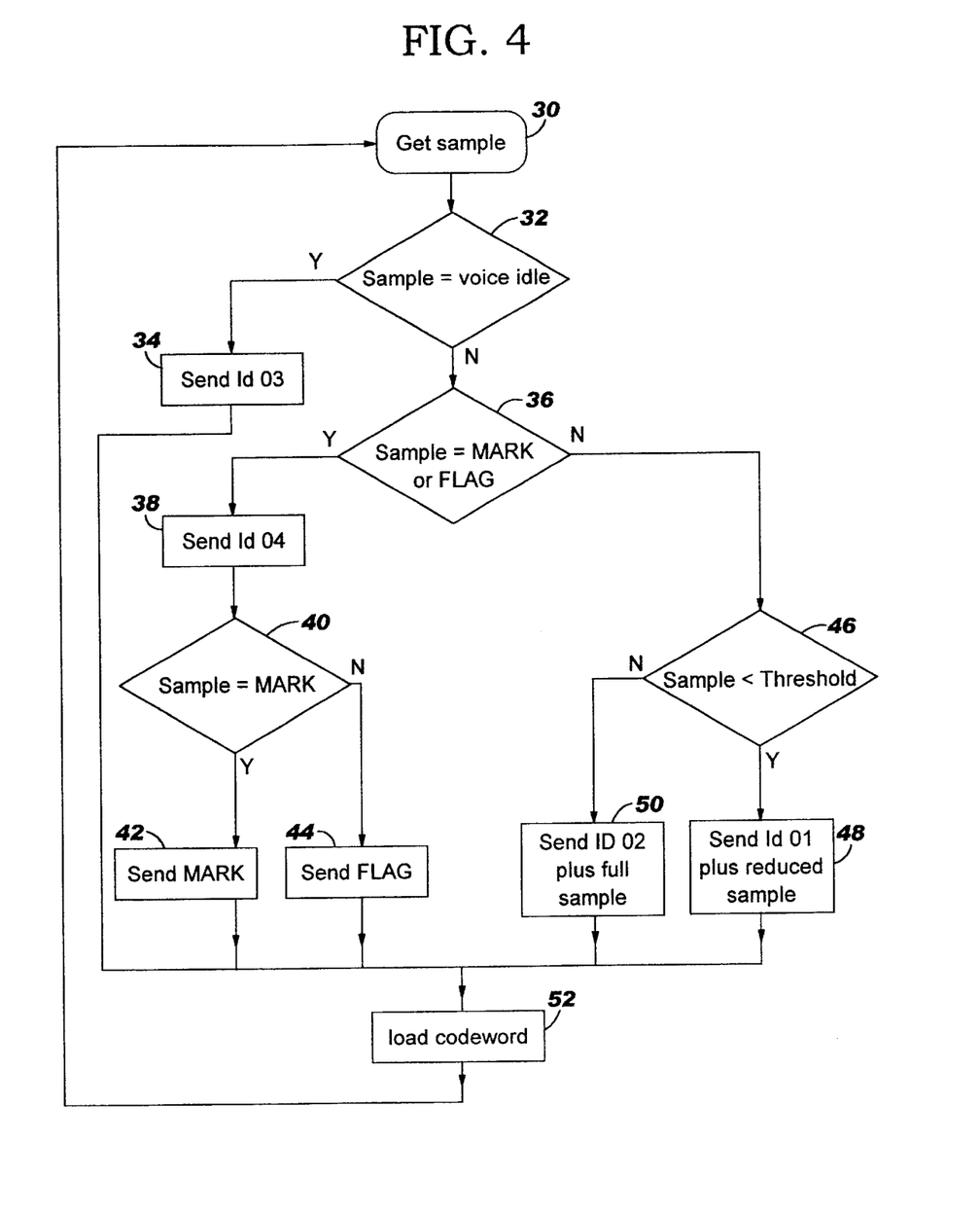
FIG. 4 is a flow chart of the compression algorithm used in the network of FIG. 1 and a cell sequence of FIG. 3, according to the invention.

A compression algorithm used in a compression device 12, 14, etc., associated with a transmitting switching node SW-3, SW-4, etc., is illustrated in FIG. 4.

At the beginning of the algorithm, a sample of one byte or "n" bytes of the same channel, "n" being 3 in the embodiment illustrated in FIG. 3, is obtained 30 from the channel. A test 32 is performed to analyze whether the sample contains only idle bytes or not. If so, the sample is replaced 34 by an identifier (Id) of two bits Id 03 representing a codeword of voice idle patterns. If not, a second test 36 is performed to analyze whether the sample contains only MARK bytes or FLAG bytes which are used by some data protocols such as HDLC, SDLC, X25 . . . as padding data and frame delimiters respectively. Note that a MARK byte is FF in hexadecimal and a flag byte is 7E in hexadecimal but can take 6 other values as the FLAG is not necessarily synchronized with the byte. It is then possible to replace MARK and FLAG bytes by 3 bits as follows:

flag 0 1 1 1 1 1 1 0 replaced by 0 0 0
flag 1 1 1 1 1 1 0 0 replaced by 0 0 1
flag 1 1 1 1 1 0 0 1 replaced by 0 1 0
flag 1 1 1 1 0 0 1 1 replaced by 0 1 1
flag 1 1 1 0 0 1 1 1 replaced by 1 0 0
flag 1 1 0 0 1 1 1 1 replaced by 1 0 1
flag 1 0 0 1 1 1 1 1 replaced by 1 1 0
mark 1 1 1 1 1 1 1 1 replaced by 1 1 1

If the sample contains only MARK or FLAG bytes, each such group of bytes is replaced by a codeword of 5 bits wherein the two first bits are Id 04 38 and the three other bits depend upon a new test 40 to determine whether the sample is a MARK byte 42 or a FLAG byte 44 which is to be replaced by 3 bits as defined hereinabove.

Returning to the test 36, when the sample does not include only MARK or FLAG bytes, the sample is processed as a voice sample and a further test 46 checks whether the different bytes of the sample have a value less than a predetermined threshold. If so 48, a codeword to be sent is composed of the two bits Id 01 followed by the significant bits of each byte in the sample as explained below. If not, that is when one or several bytes of the sample are not less than the predetermined threshold 50, the full sample is transmitted being preceded by the 2 bits of Id 02. Then, the codeword Id 01, Id 02 which has been determined is loaded in a buffer before being transmitted in a specific frame as described later.

In the preferred embodiment of the invention, a byte associated with a channel is formatted according to the A law (or µ law) as follows:

S XYZ ABCD
wherein bit 0=sign S
bits 1, 2, 3=segment XYZ
bits 4, 5, 6, 7=level ABCD Accordingly, a way to check whether each byte of the sample is less than a predetermined threshold (step 46 of FIG. 4) is to verify that the value represented by the byte such that the segment value is 000 (that is the value is comprised in the first segment). In such a case, only bit S and level bits ABCD are useful to be transmitted. Accordingly, the byte is reduced to 5 bits (S ABCD).

When using the A-law, simulations performed on voice samples have shown, that a good compression is possible by using less than a full segment as threshold. Two other configurations can be used.

the threshold is set at the half of the first segment. The 4 significant bits to be transmitted are S BCD.

the threshold is set at the fourth of the first segment. The 3 significant bits to be transmitted are S BC. This way offers the best compression based on average low level voice characteristics but the real result may depend upon equipment characteristics, lines . . . .

It must be noted that reducing more than 3 bits may lead to having not enough samples under the threshold, which would decrease the compression rate. Anyway, it is advisable to try different compression modes on each line to identify which one is the best one. A solution consists in changing compression characteristics online to adjust dynamically to the best compression mode.

Figure 5:
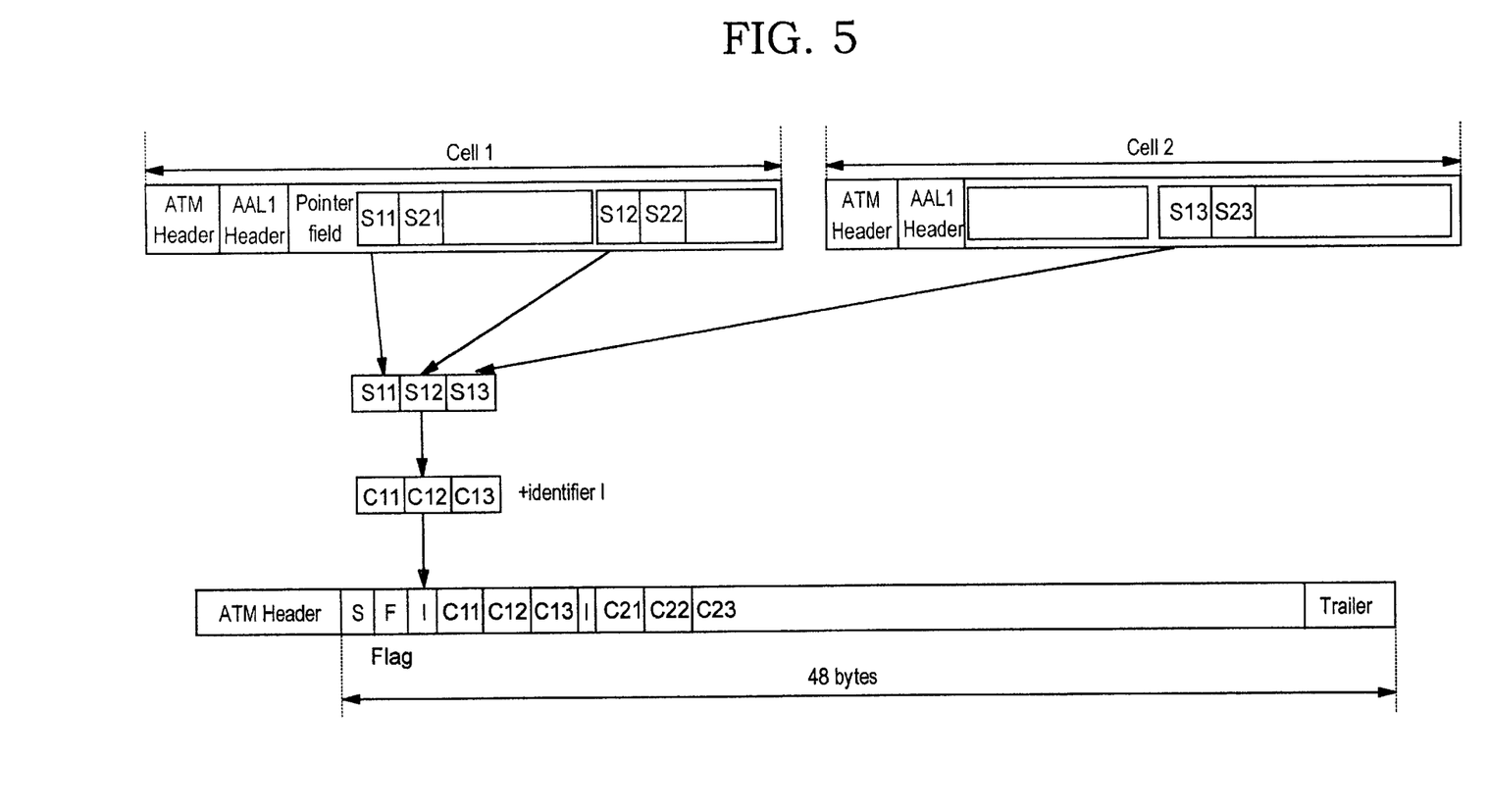
FIG. 5 is an illustration of a transformation from the two ATM cell sequence illustrated in FIG. 3 into a new frame after compression.

FIG. 5 illustrates the transformation from the group of two ATM cells into a new compressed frame.

As described in reference to FIG. 4, a group of 3 bytes S11, S12, S13 corresponding to the same channel are compressed to build codewords formed with a 2 bit Id followed either by 3 elements (full bytes or reduced bytes) for Id 01 and Id 02, 3 bits for Id 04 or nothing for Id 03. As shown in FIG. 5, the resulting codewords C11, C12, C13 are orderly merged within a new frame. This new frame includes a header having two fields, a sequence number S and a flag F indicating the presence of a trailer. Indeed, the number of codewords that compose the frame may not fit exactly the number of bytes. In such a case, it may be useful to fill the remaining locations with a padding pattern. Such a pattern can be Id 02 followed by the number "n" of bits indicating how many bytes are analyzed together in order to be compressed. When received by a receiver, the protocol detects that the number of bits following Id 02 does not match the number "n" indicated by the trailer, for example n=3 in the present case. Note that this new frame is 48 bytes long and is preceded by an ATM header.

Figure 6:
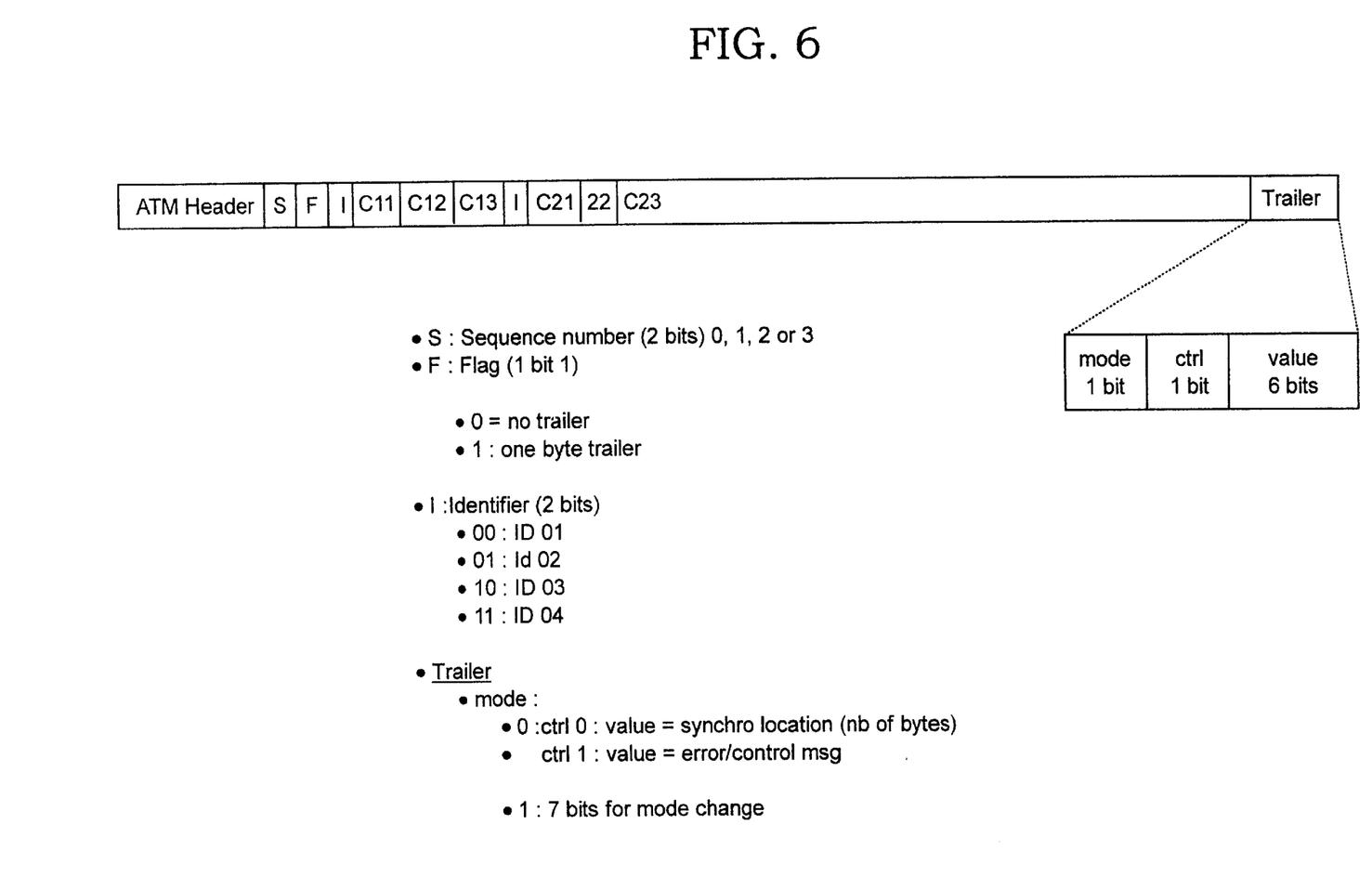
FIG. 6 is a detailed representation of a new frame resulting from the compression according to the invention.

FIG. 6 represents the detailed contents of a new frame resulting from the invention. As illustrated, each group such as C11, C12, C13 is preceded by an identifier which can be Id 01 to Id 04. In some cases, the identifier I is followed by nothing (Id 03) or only 3 bits (Id 04).

Note that the trailer can be used to indicate the location of a synchro byte as illustrated in FIG. 6 by the field "value 6 bits". When a synchro byte is used, it corresponds exactly to the position of the pointer within the ATM cell. The synchro byte is used to adjust the synchronization. As the synchro byte corresponds to a byte location in the frame, the codeword preceding the synchro byte may not match exactly the previous byte. In such a case, it is necessary to pad some bits before the synchro byte, and the same padding pattern described hereinabove can be used.

Note that a first bit of the trailer, a mode bit, can be set to 1 in order to change online the compression characteristics of a channel. In such a case, the 7 following bits are used for this change. The two first bits indicate which one of four possible cases is used by modifying the predetermined threshold as explained above, and the following 5 bits indicate which channel is concerned among the channels of the E1 frame.

Figure 7:
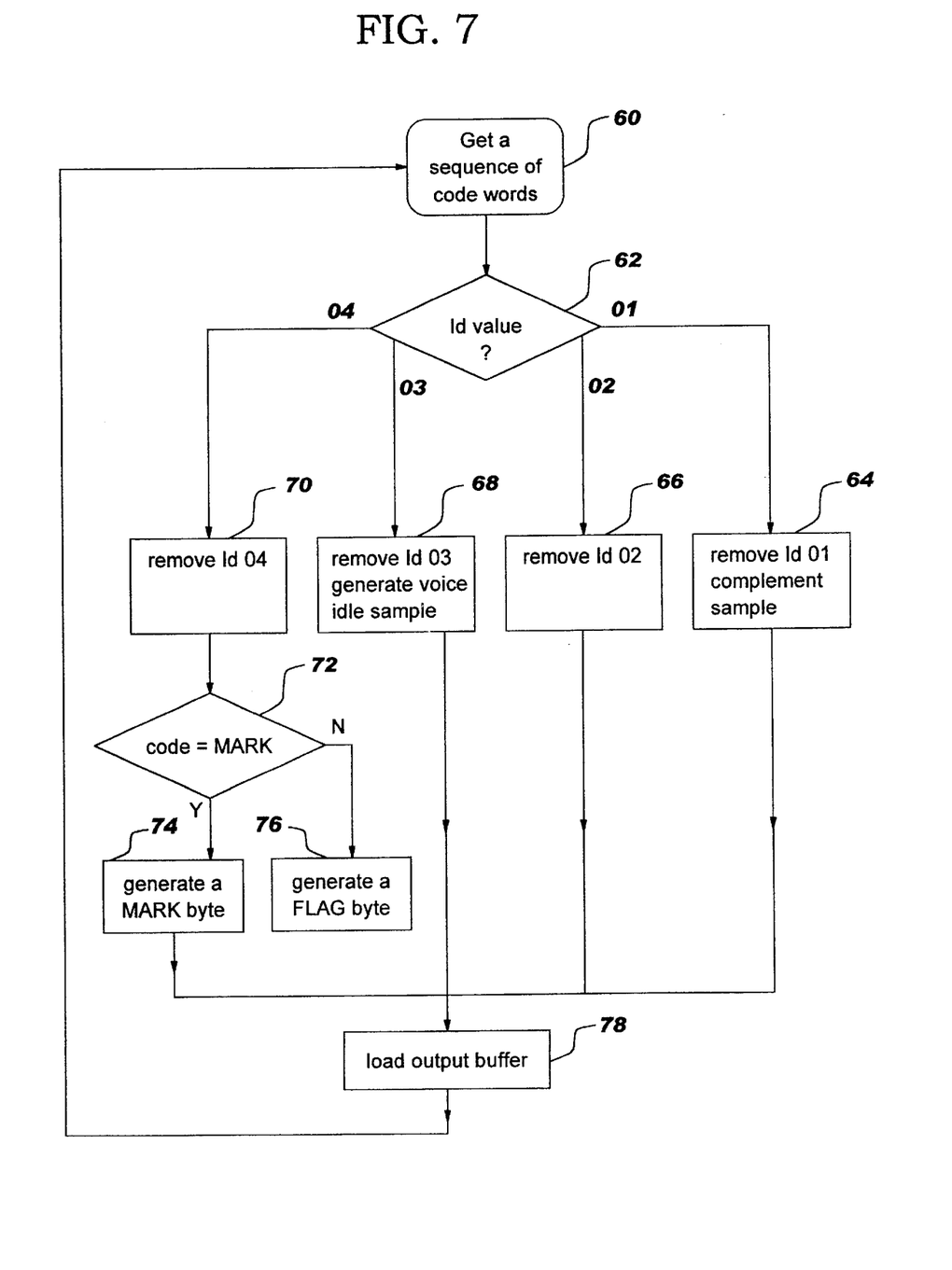
FIG. 7 is a flow chart of a decompression algorithm used at a destination exchange telephone device to recover the compressed data and voice signals, according to FIG. 4.

When a frame resulting from the compression algorithm according to the invention is received at the destination exchange telephone device PABX A, PABX B, CX, etc. (see FIG. 1), the frame is processed in accordance with the algorithm illustrated in FIG. 7. First, a sequence of codewords such as C11, C12, C13 preceded by an identifier I is obtained 60 from the frame. The value of identifier I is then analyzed 62 before being removed. But, the operation to be performed is dependent upon the value of identifier I:

- if I=Id 01 64, the following codewords have been reduced. Therefore the received codewords are complemented to obtain 8 bit words;
- if I=Id 02 66, the codewords are kept unchanged since they have not been compressed;
- if I=Id 03 68, the codewords correspond to voice idle and therefore, voice idle samples are generated;
- if I=Id 04 70, the codewords correspond to MARK or FLAG samples. In such a case, a test 72 is performed to determine whether the 3 following bits correspond to MARK bytes or FLAG bytes. If they are a MARK code, MARK bytes are generated 74. Otherwise, FLAG bytes according to the above mentioned code, are generated 76. Then, the resulting codewords are loaded in the output buffer 78 before being transmitted to the destination exchange telephone device.

In conclusion, though the compression algorithm according to a preferred embodiment of the invention is applied to groups of 3 consecutive bytes of any channel, the algorithm can be applied to any number "n" of consecutive bytes. It may work byte-by-byte while its performance will be better by using a few number of consecutive bytes. The algorithm is more efficient to have a good compression rate for idle/low level voice where consecutive samples have a high probability to stay within the same range. By increasing the number of bytes which are compressed simultaneously, the delay (125 $\mu$s by supplementary byte) is increased, and therefore the buffer size and the management complexity are also increased. Furthermore, there is the drawback to find not enough samples within the threshold value which will decrease significantly the compression rate. Therefore, a number "n" comprised between 3 and 10 of bytes can be considered as a good trade-off.

What is claimed is:

1. A communication system for compressing/decompressing data in a transmission system wherein multiplexed data channels are transported over a transmission network, comprising:

a plurality of switching nodes interconnected by a connection lines;

intermediary switching nodes connected only to other switching nodes, and end switching nodes connected to at least an exchange telephone device;

a control point associated with each switching node in charge of controlling the exchange of data signals carried out by switching said multiplexed data channels in the network between two exchange telephone devices;

the control points associated with the switching nodes aiding in determining the best route between any source exchange telephone device and any destination exchange telephone device;

each of said multiplexed channels transporting data cells representing said data signals from one source exchange telephone device to one destination exchange device during an exchange of information therebetween;

a compression/decompression device connected between each an exchange telephone device and the end switching node, the compression/decompression device using a statistical compression algorithm comparing signal values associated to each one of the plurality of "n" consecutive data bytes to a predetermined threshold for modified or not modified data bytes wherein an identifier indicates whether data cells are modified or not before transmitting a compression frame of data cells over the transmission network.

2. The communication system of claim 1 wherein the compression/decompression device further includes a decompression algorithm for identifying the identifiers in the compression frame and disassembling the frame into groups of data cells for the end switching node.

3. The communication system of claim 1 further comprising:

(a) means for combining groups of data cells in a channel as a compressed frame for transmission to an end switching node.

4. The communication system of claim 1 further comprising:

(a) means for comparing a signal value for a data cell against a threshold to delete all bits from the cell which are not necessary to represent the signal value if the signal value is less than the threshold; and (b) means for assigning an identifier to the data cell indicative of a modified data cell.

5. The communication system of claim 1 further comprising:

(a) means for comparing a signal value for a data cell against a threshold to transmit all bits in the data cell if the signal value is greater than the threshold; and (b) means for assigning an identifier to the data cell indicative of an unmodified data cell.

6. The communication system of claim 1 further comprising;

(a) means for forming a compressed data frame comprising a plurality of data cells in successive channel transmission; an identifier for each cell; a network header; a sequence field; a flag field and a trailer field.

7. The communication system of claim 1 further comprising:

(a) means for adjusting the synchronization of the data cells in the channel.

8. The communication system of claim 1 further comprising:

(a) means for changing online the compression characteristics of a channel.

9. In a communication system comprising a plurality of switching nodes interconnected by connection lines; intermediary switching nodes, connected only to other switching nodes and end switching nodes connected to at least an exchange telephone device; a control point associated with each switching node in charge of controlling the exchange of data signals carried out by switching said channels in the network between two exchange telephone devices; a compression/decompression device connected between each switching node and end switching node, a method for compressing/decompressing data in a transmission system wherein multiplexed data channels are transported over a transmission network, comprising the steps of:

comparing, for each multiplexed channel, the signal value associated to each one of a plurality of "n" consecutive data bytes to a predetermined threshold;

deleting, in case said signal value for all said "n" consecutive data bytes is less than said predetermined threshold, all bits which are not necessary to represent said signal value from each of said "n" data bytes;

building a compression frame by concatenating either groups of said "n" data bytes when they are not modified or groups of "n" modified data bytes when bits have been deleted therefrom, each of said groups being associated with one of said channels; and adding to each of said groups an identifier indicating whether said data bytes are modified or not before transmitting said compression frame over said transmission network.

10. The method according to claim 9, wherein said identifier (I) can have a first value (Id 01) indicating that said group is composed of "n" bytes which have been reduced by deleting all bits which are not necessary to represent said signal value, or a second value (Id 02) indicating that said group is composed of said "n" bytes which have not been modified.

11. The method according to claim 9, wherein said identifier (I) can have a third value (Id 03) indicating that said group includes no bits because said "n" data bytes correspond to the idle status.

12. The method according to claim 9, wherein said identifier (I) can have a fourth value (Id 04) indicating that said group is composed of codes representing MARK bytes or FLAG bytes.

13. The method according to claim 9, wherein a greater part of data bytes represent voice signals and are obtained by applying an A-law resulting in a byte composed of one sign bit (S), three segment bits (X Y Z) and four level bits (A B C D).

14. The method according to claim 9, wherein said predetermined threshold corresponds to the value of a first segment, and said deleting step consists in deleting all segment bits X Y Z in order to obtain reduced data bytes of 5 bits (S A B C D).

15. The method according to claim 9 wherein said compression frame is completed with padding bits when said concatenated groups do not fit exactly to the entire compression frame.

16. The method according to claim 9 wherein said compression frame includes a trailer indicating a location of a synchronization byte in said compression frame.

17. The method according to claim 9 wherein "n" is in the range of 3 to 10.

18. The method according to claim 9 wherein said transmission network is an ATM network.

19. A communication system wherein multiplexed voice channels are transported in data cells over a transmission network comprising:

(a) compression-decompression devices, each one being connected between each end switching node and an adjacent intermediary switching node;

(b) collecting apparatus which collects a data sample including "n" bytes composed of one byte of a channel taken in "n" consecutive data cells, (c) comparing apparatus which compares the signal value of each byte in said sample with a predetermined threshold, (d) deleting apparatus which deletes all bits from the bytes which are not necessary to represent said signal value when the signal values of said n bytes are less than said predetermined threshold, (e) assigning apparatus which assigns an identifier ahead of said sample, said identifier indicating whether said sample is a modified sample or not; and (f) transmitting apparatus which transmits said sample with said identifier to the adjacent switching node.

20. The communication system according to claim 19, wherein each one of said compression-decompression devices further comprises:

(g) frame building apparatus which builds a compression frame by concatenating either samples of said n bytes when they are not modified or samples of "n" modified bytes when bits have been deleted therefrom, each of said samples being associated with one of said channels.

21. The communication system according to claim 20, wherein said identifier (I) can have a first value (Id 01) indicating that said sample is composed of "n" bytes which have been reduced by deleting all bits which are not necessary to represent said signal value, or a second value (Id 02) indicating that said sample is composed of said n bytes which have not been modified.

22. The communication system according to claim 20, wherein said identifier (I) can have a third value (Id 03) indicating that said sample includes no bits because said n data bytes correspond to the idle status.

23. The communication system according to claim 20, wherein said identifier (I) can have a fourth value (Id 04) indicating that said sample is composed of codes representing MARK bytes or FLAG bytes.

24. The communication system according to any one of claims 19–23, wherein the bytes represent voice signals and are obtained by applying the A-law resulting in a byte composed of one sign bit (S), three segment bits (X Y Z) and four level bits (A B C D).

25. The communication system according to claim 24, wherein said predetermined threshold corresponds to the value of the first segment, and said deleting step consists in deleting all segment bits X Y Z in order to obtain reduced data bytes of 5 bits (S A B C D).

26. The communication system according to claim 24, wherein said compression frame is completed with padding bits when said concatenated samples do not fit exactly to the entire compression frame.

27. The communication system according to claim 24, wherein said compression frame includes a trailer for indicating the location of a synchronization byte in said compression frame.

28. The communication system according to claim 24, wherein n is equal to 3.

29. The communication system according to claim 24, wherein said transmission network is an ATM network.

* * * * *